United States Patent
Mujica et al.

(10) Patent No.: US 10,904,165 B2
(45) Date of Patent: *Jan. 26, 2021

(54) REDUNDANT COMMUNICATION PATH TRANSMISSION

(71) Applicant: Apple Inc., Cupertino, CA (US)

(72) Inventors: Fernando A. Mujica, Los Altos, CA (US); Joyce Y. Kwong, Cupertino, CA (US); Leland W. Lew, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/282,190

(22) Filed: Feb. 21, 2019

(65) Prior Publication Data

US 2019/0190854 A1  Jun. 20, 2019

Related U.S. Application Data

(63) Continuation of application No. 15/705,156, filed on Sep. 14, 2017, now Pat. No. 10,218,644.

(60) Provisional application No. 62/397,871, filed on Sep. 21, 2016.

(51) Int. Cl.
*H04L 12/939* (2013.01)
*H04L 12/24* (2006.01)
*H04L 12/825* (2013.01)
*H04L 12/707* (2013.01)
*H04L 12/725* (2013.01)

(52) U.S. Cl.
CPC ........ *H04L 49/552* (2013.01); *H04L 41/0659* (2013.01); *H04L 41/0672* (2013.01); *H04L 45/24* (2013.01); *H04L 45/306* (2013.01); *H04L 47/25* (2013.01)

(58) Field of Classification Search
None
See application file for complete search history.

(56) References Cited

U.S. PATENT DOCUMENTS

| | | | | |
|---|---|---|---|---|
| 2011/0158128 A1* | 6/2011 | Bejerano | ................ | H04L 45/16 370/256 |
| 2014/0086136 A1* | 3/2014 | Angst | ................ | H04L 49/9089 370/312 |
| 2015/0103671 A1* | 4/2015 | Ernstrom | ................ | H04L 45/18 370/238 |
| 2015/0200803 A1* | 7/2015 | Kashyap | ............. | H04L 41/0668 370/217 |
| 2015/0222491 A1* | 8/2015 | Clark | ...................... | H04L 45/48 370/256 |

(Continued)

*Primary Examiner* — Shripal K Khajuria
(74) *Attorney, Agent, or Firm* — Robert C. Kowert; Kowert, Hood, Munyon, Rankin & Goetzel, P.C.

(57) ABSTRACT

Data generated by one or more data producers may be transmitted via multiple communication paths according to a path transmission scheme that divides transmission of different portions of the data amongst different communication paths. Upon a failure of a communication path, transmission of data may continue for those portions of data that are not assigned to the failed communication path. In some embodiments, modifications to the path transmission scheme may be made to change the division of data amongst remaining communication paths in the event of failure.

20 Claims, 9 Drawing Sheets

(56) References Cited

U.S. PATENT DOCUMENTS

| | | | | |
|---|---|---|---|---|
| 2015/0237365 A1* | 8/2015 | Takahashi | ............ | H04N 19/172 |
| | | | | 375/240.16 |
| 2015/0312578 A1* | 10/2015 | Sato | .................... | H04N 19/187 |
| | | | | 375/240.02 |
| 2016/0006602 A1* | 1/2016 | Angelow | ................ | H04L 45/28 |
| | | | | 370/226 |
| 2016/0360555 A1* | 12/2016 | Berezowski | .......... | H04W 40/00 |
| 2017/0310553 A1* | 10/2017 | Welters | ................ | H04W 48/16 |

\* cited by examiner

REDUNDANT COMMUNICATION PATH TRANSMISSION

RELATED APPLICATIONS

This application is a continuation of U.S. patent application Ser. No. 15/705,156, filed Sep. 14, 2017, which claims benefit of priority to U.S. Provisional Application Ser. No. 62/397,871, entitled "Redundant Communication Path Transmission," filed Sep. 21, 2016, which are incorporated herein by reference in their entirety.

BACKGROUND

For systems that utilize a stream of information to make critical decisions to control various system resources, reliable transmission of the information is crucial. To ensure that information is reliably received, redundant transmission of data is often implemented. Redundancy, however, imposes costs. Implementing multiple communication paths to transmit the same information multiplies the communication bandwidth implemented, without providing any additional communication capacity. Moreover, when high redundancy requirements are necessary, implementing a sufficient number of redundant communication paths can quickly become unfeasible in certain applications.

SUMMARY

Redundant communication path transmission is described that provides for efficient utilization of multiple communication pathways without substantial data loss in the event of communication path failures. A redundant path transmission scheme is described that divides transmission of data from a data producer amongst multiple communication paths. When a failure of one of the communication paths occurs, the transmission of data from the data producer may continue via remaining communication paths according to the same division of transmission. In this way, data loss is limited to the portion of the data transmitted via the failing communication path, while at least some of the data continues to be transmitted.

Figure 1A:
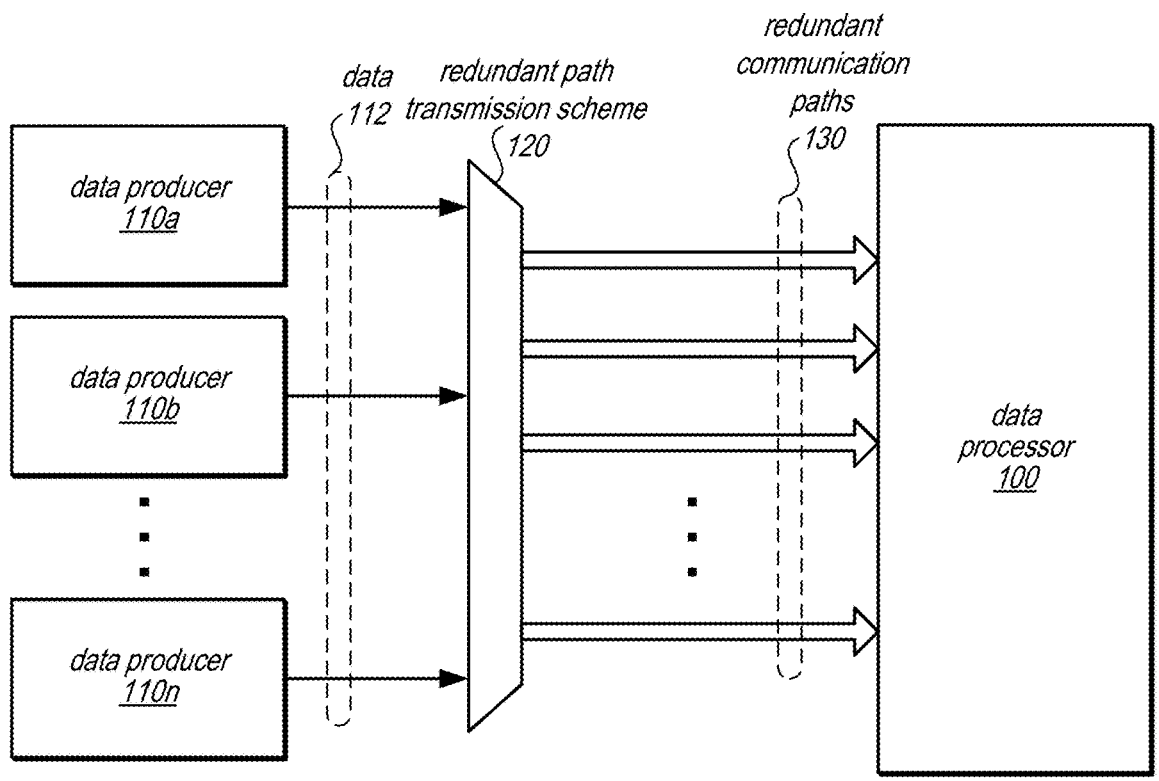
FIGS. 1A and 1B illustrate logical block diagrams of example redundant communication path transmission, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement redundant communication path transmission for data generated by one or more data producers. Many systems rely upon transmitted data to make operational decisions. Control systems, for instance, may utilize sensor data or other information (e.g., state information) provided to the control system by data producers that generate the sensor data or other information. Once received, the data may be analyzed, evaluated, or otherwise processed in order to obtain information which may be reasoned over to make operational decisions. Because data corruption or loss can result in delayed or faulty decision-making, redundancy is often introduced to provide reliable transmission of data.

Redundancy schemes are typically implemented by providing multiple paths that fully replicate data sent from a data producer, which generates the data, to a data processor, which receives and/or evaluates the data for various purposes. For instance, an image sensor that captures an image frame may transmit the entire image frame over multiple redundant communication paths to the same data processor that evaluates the image frame. While such schemes may offer high reliability, increasing redundancy by fully replicating data along redundant pathways can become prohibitively expensive to implement (e.g., in scenarios where it is desirable to redundantly provide large amounts of data). Redundant communication path transmission can instead be implemented to divide transmission of data along multiple redundant communication paths without fully replicating the same data along each path.

Figure 1B:
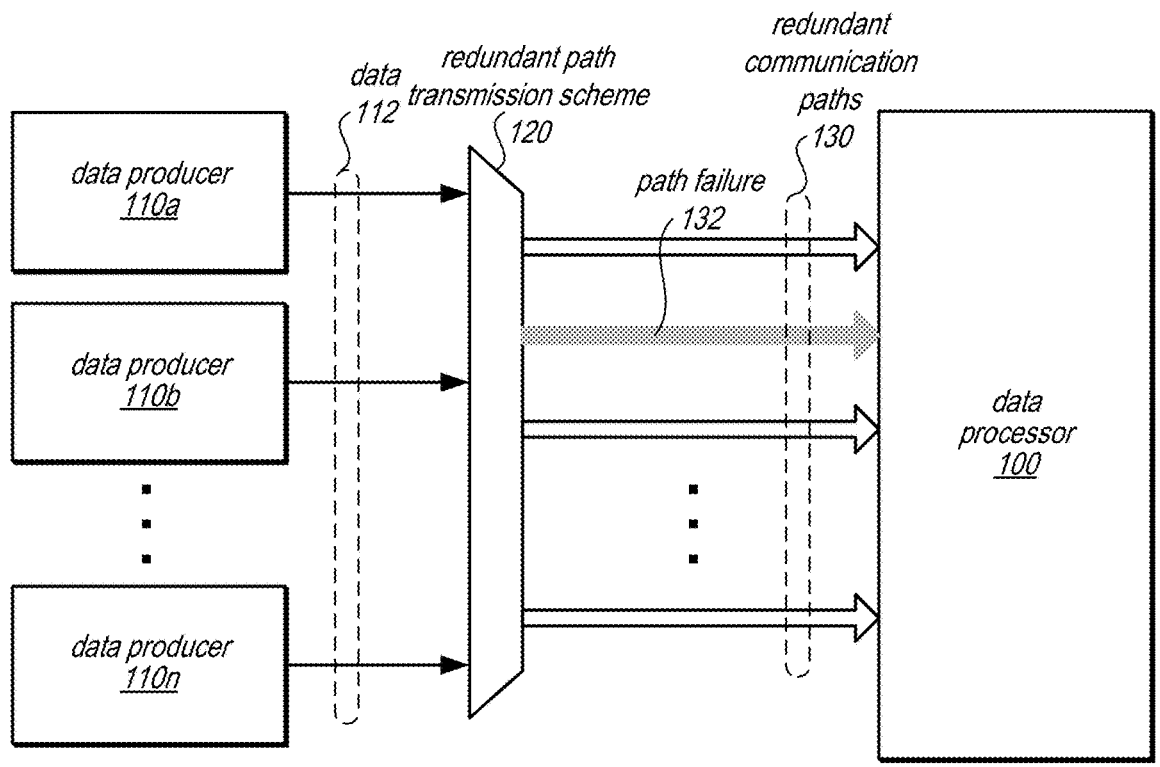

FIGS. 1A and 1B illustrate logical block diagrams of redundant communication path transmission, according to some embodiments. In FIG. 1A, multiple data producers, such as data producers 110a, 110b, through 110n, may generate and send data 112 for processing at data processor 100 via different communication paths 130 (or "redundant communication paths") according to redundant path transmission scheme 120. Data producers 110 may be various kinds of sensors, such as sensors that capture image data, auditory data, or other sensory/environmental data, range or distance data, location data (e.g., global positioning system (GPS) coordinates), movement data (e.g., gyroscope data), or other systems, components, or devices that generate data for consumption or evaluation by data processor 100 (e.g., component state or object status information, metrics, statistical calculations or estimates, user input data, etc.).

Redundant communication paths 130 may be multiple communication interconnects, mediums, or technologies (e.g., Ethernet cable or fiber optic cable) via which data 112 may be transmitted. Redundant transmission scheme 120 may be a schedule, pattern, assignment, or transmission architecture which divides portions of data 112 so that the different portions of the data generated by a single data producer, such as data producer 110a, are transmitted across different redundant communication paths, as discussed below with regard to FIGS. 3A-5B. For example, redundant path transmission scheme 120 may interleave different portions of data 112 from different data producers 110, at each redundant communication path 130 so that at time 0, a portion of data 112 from data producer 110a may be transmitted via a first redundant communication path, a portion of the data 112 from data producer 110b may be transmitted via a second communication path 130, and so on. At time 1, a portion of data 112 from data producer 110b may then be transmitted via a first redundant communication path 130, a portion of data 112 from data producer 110n may then be transmitted via second redundant communication path 130, and a portion of data producer 110a may then be transmitted via a third redundant communication path 130. Redundant path transmission scheme 120 may be implemented to combine, distribute, or otherwise divide portions of data 112 in many ways and may be implemented at an interface that receives data from data producers 110 prior to transmission along redundant communication paths 130 or directly at data producers 110.

Redundant path transmission scheme 120 may provide for divided transmission of data 112 so that in the event that transmission via one of redundant communication paths 130 is halted, remaining communication paths 130 may still transmit those portions of data 112 identified for the remaining communication paths. For instance, as illustrated in FIG. 1B, path failure 132 makes one of redundant communication paths 130 unavailable. However, redundant path transmission scheme 120 may identify other portions of data 112 that are still transmitted across remaining redundant communication paths 130. In this way, redundant path transmission scheme 120 may automatically compensate for communication failure without losing transmission of more data than that was assigned to the failed path 132. If, for instance, a different image frame from an image sensor (e.g., data producer 110b) is sent at different time intervals along redundant communication paths 130, then 3 out of 4 image frames captured by the image sensor may still be transmitted to data processor 100.

Redundant path transmission scheme 120 may be implemented differently in order to account for the varying priority of data generated and sent from different data producers 110. For example, if data producer 110n generates data used to perform safety-related operations, then redundant path transmission scheme 120 may assign more timeslots among redundant communication paths 130 (e.g., 2 out of 4 timeslots) as opposed to data generated by data producers 110a or 110b, which may be used for performing other operations that are not safety-related. In some embodiments, redundant path transmission scheme 120 may be modified, in some embodiments, in order to dynamically adjust the transmission of data 112 in the event of path failures, as discussed below with regard to FIGS. 6 and 8.

Note that the illustrated depiction and accompanying description of redundant communication path transmission is not intended to be limiting as to the number or configuration of data producers, data processors, redundant communication paths or redundant path transmission scheme. For example, in some embodiments, as discussed below with regard to FIGS. 4A and 4B, a single data producer may utilize redundant communication paths to reliability transmit data according to a redundant path transmission scheme that divides the data generated by the single data producer amongst the redundant communication paths.

Next, the specification describes an example control system that may receive data transmitted over redundant communication paths according to a redundant path transmission scheme. Various examples of components or configurations of redundant communication paths and redundant communication path transmission schemes may then be discussed. Flow charts describing various methods and techniques to implement redundant path communication for transmitting data are then described. Finally, a description of an example computing system upon which the various components, modules, systems, devices, and/or nodes may be implemented is provided. Various examples are provided throughout the specification.

Redundant path transmission of data may increase the accuracy and reliability of decision-making for those systems that utilize data provided via redundant communication paths. Control systems, for example, often rely upon data provided from various sources in order to make management or operational decisions to control system resources. Control systems may be implemented in many different scenarios. For example, some control systems may be implemented as part of production or materials handling facilities, directing the performance of individual processes or a workflow across an entire facility. In such scenarios, data received from sensors or other data producers may be used to automate safety related operations, work-in-progress controls, or many other facility operations.

Control systems may also be implemented as part of individual machines to automate the operation or functions of the individual machine (e.g., starting, stopping, or changing operations). In some embodiments, control systems may be implemented as part of vehicles to provide automated control of various vehicle functions. For instance, an autonomous navigation system may be implemented to control navigation (e.g., driving) of a vehicle autonomously along at least a portion of a route based upon active control of the control elements of a vehicle, including steering control elements, throttle control elements, braking control elements, transmission control elements, etc. independently of control element input commands from a user of the vehicle. The autonomous navigation system may receive input data via redundant communication paths from external sensor devices, such as camera devices, video recording devices, infrared sensor devices, radio detection and ranging (radar) devices, light-scanning devices including light detection and ranging (LiDAR) devices, precipitation sensor devices, ambient wind sensor devices, ambient temperature sensor devices, position-monitoring devices which can include one or more global navigation satellite system devices (e.g., GPS, BeiDou, DORIS, Galileo, GLONASS, etc.), some combination thereof, or the like, as well as other data producers in reliable fashion according to a redundant path transmission scheme without fully replicating the sensor data and other data along each redundant communication path.

Figure 2:
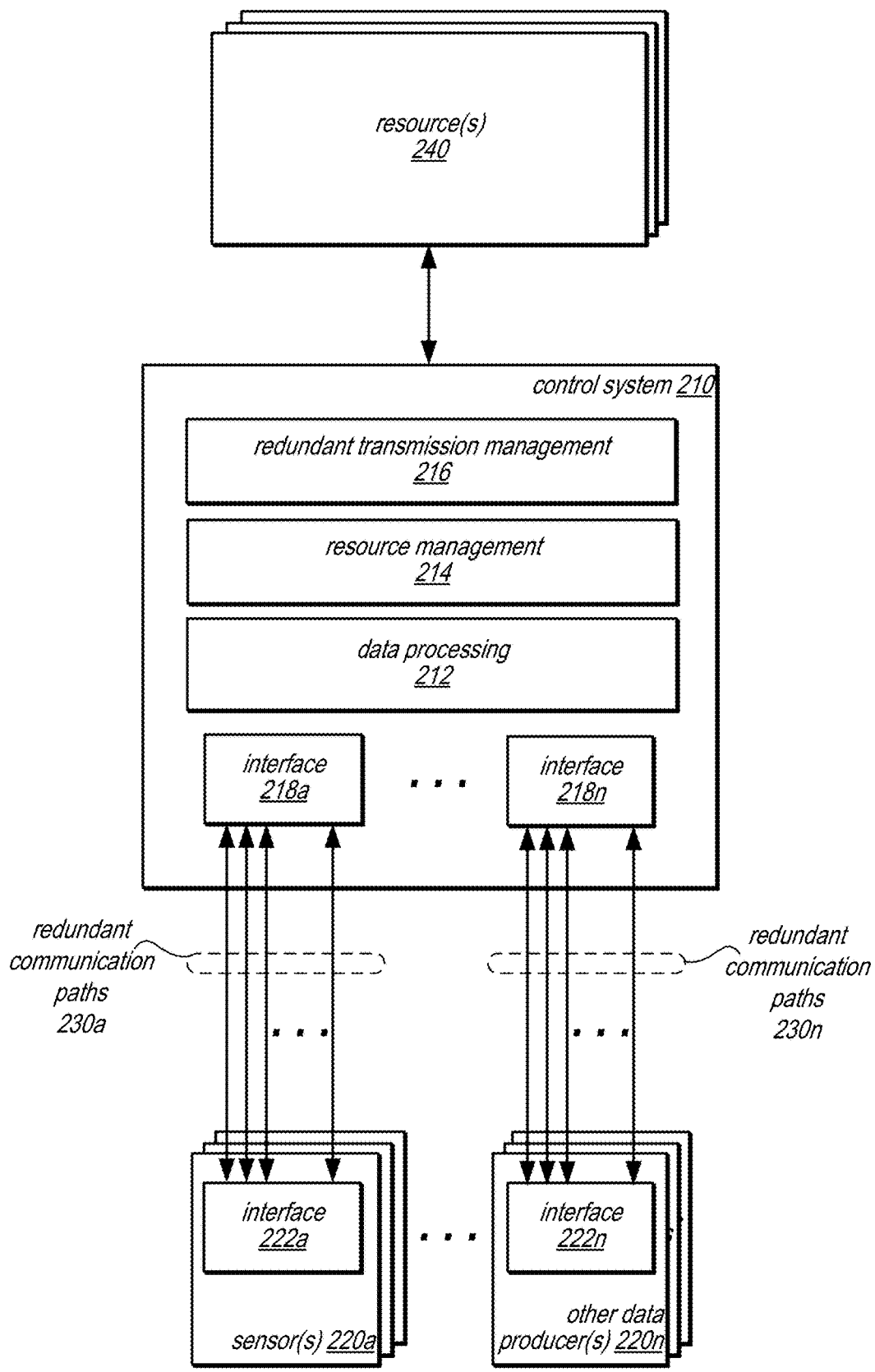
FIG. 2 illustrates a logical block diagram of an example control system that utilizes redundant communication path transmission to receive data from data producers, according to some embodiments.

Control systems may be implemented in various ways. FIG. 2 illustrates a logical block diagram of a control system that utilizes redundant communication path transmission to receive data from data producers, according to some embodiments. In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below.

Control system 210 may manage various system resource(s) 240. As noted above, system resource(s) 240 can be controls, sub-systems, or other components implemented in large-scale control system environments to controls, sub-systems, or other components implemented as part of individual machines or vehicles (e.g., control elements of a vehicle) that may be automatically managed or directed by control system 210. Control system 210 may implement resource management 214 in order to direct operation of system resource(s) 240 according to various rules, knowledge bases, procedures, or other decision making techniques. In order to make operational decisions, control system 210 may implement data processing 212 to evaluate input data received from various data producers, such as sensors 220a and other data producers 220n via redundant communication paths 230a and 230n. For example, data processing 212 may parse, aggregate, and/or evaluate received data in order to detect various events. Consider the autonomous navigation system example given above. Data processing 212 may evaluate received sensor data to recognize objects, such as other vehicles or pedestrians, near a vehicle obstructing the vehicle's planned route. A route modification event may be triggered so that resource management 214 may determine a route adjustment and direct system resource(s) 240 to implement the modified route in order to avoid the recognized object.

For some of the input data that control system 210 receives, redundant communication paths 230 may be implemented. For example, one or more multiple sensor(s) 220a may transmit data via redundant communication paths 230a to control system 210. Different groups, sets, or configurations of redundant communication paths may be implemented so that different data producer(s) share redundant communication paths separate from other data producers. For instance, as illustrated in FIG. 2, other data producer(s) 220n may utilize different redundant communication paths, redundant communication paths 230n, to transmit data to control system 210. Note that not all input data provided to control system 210 may be provided via redundant communication paths. Some input data from other data producers (not illustrated) may be provided to control system 210 via a non-redundant communication paths.

Redundant communication path(s) 230 may be implemented according to various transmission mediums, such as Ethernet communication over twisted pair cabling, optical fiber cabling, or coaxial cabling, or other serial or parallel bus communications utilizing a variety of different interface formats and physical link technologies. In at least some embodiments, data producers, such as sensors 220a and other data producers 220n, may implement an interface, such as interfaces 222a and 222n, which may receive the generated data, prepare and transmit the generated data according to the appropriate format for transmission along the redundant communication path. Similarly, control system 210 may implement corresponding interfaces, such as interfaces 218a and 218n, to receive the data transmitted via the redundant communication paths in order to format or prepare the data for consumption by data processing 214. For example, in some embodiments, interfaces 222 and 218 may be network interface controllers (NICs) that facilitate Ethernet communications along redundant communication paths 230.

In at least some embodiments, interfaces 222 may impose or direct the transmission of data via redundant communication paths 230 according to a redundant path transmission scheme. However, in other embodiments, data producers may separately enforce the redundant path transmission scheme. The redundant path transmission scheme may be predefined for various data producers and redundant communication paths (e.g., at installation). In some embodiments, the redundant path transmission scheme may be programmable or defined upon control system 210 startup, data producer startup or dynamically modified in response to changing circumstances. Control system 210 may implement redundant transmission management 216 to define or modify the redundant transmission scheme, in some embodiments. For example, changing circumstances may result in certain data being more desirable than other data. Redundant transmission management 216 may determine a modification to increase the transmission rate (e.g., number of timeslots) assigned to data producers that provide the desirable data and then request the modification at interfaces 222 or data producers 220. In at least some embodiments, redundant transmission management 216 may detect path failures and modify transmission of data or the redundant path transmission scheme, as discussed below with regard to FIGS. 6 and 8.

FIGS. 3A-5B illustrate various examples of redundant path transmission schemes that may be implemented by interfaces, such as interfaces 222 or directly by the data producers, such as sensor(s) 220a or other data producer(s) 220n. Note that the application of redundant path transmissions schemes could be similarly applied to different numbers of redundant paths than those discussed below.

Figure 3A:
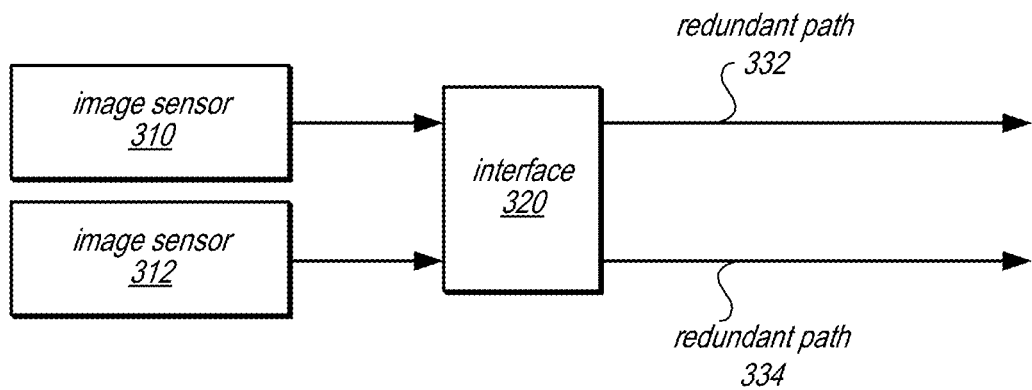
FIG. 3A illustrates a logical block diagram of example homogenous data producers transmitting data via redundant communication paths, according to some embodiments.

FIG. 3A illustrates a logical block diagram of homogenous data producers transmitting data via redundant communication paths, according to some embodiments. Image sensor 310 and image sensor 312 may be homogenous image sensors that capture image data according to a same image data format, resolution, or technology (e.g., utilizing a charge-coupled device (CCD) or active-pixel sensor (APS)). The captured image data may be captured as a frame or portion of a frame (e.g., a row pixel data) and transmitted via interface 320 along redundant paths 332 and 334. A redundant path transmission scheme may divide the captured image data from image sensor 310 and image sensor 312 by interleaving the image data at different time slots.

Figure 3B:
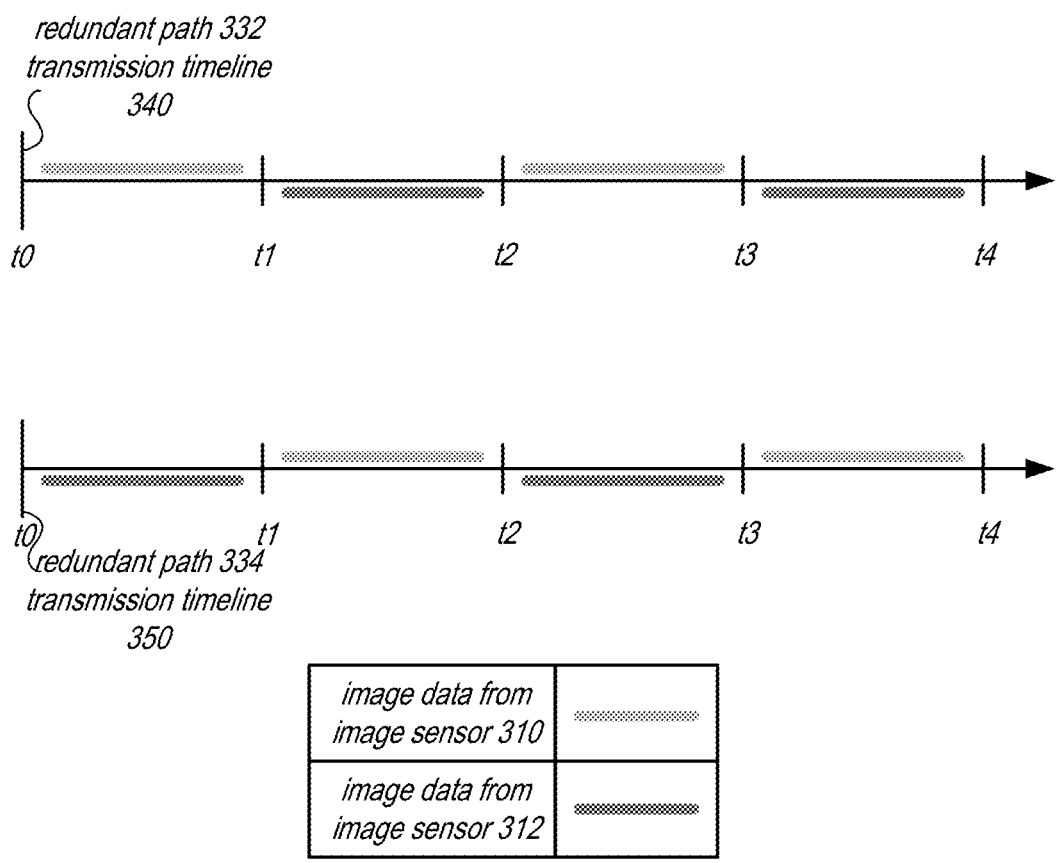
FIG. 3B illustrates an example redundant path transmission scheme for homogenous data producers, according to some embodiments.

FIG. 3B illustrates a redundant path transmission scheme for homogenous data producers, according to some embodiments. Redundant path 332 transmission timeline 340 indicates that the image data captured by image sensor 310 and image sensor 312 may be interleaved or alternated at different time slots (e.g., image data from sensor 310 being transmitted at t0 and t2 and image data from sensor 312 being transmitted at t1 and t3). Redundant path 334 transmission timeline 350 also indicates that image data capture from image sensor 310 and image sensor 312 may be interleaved or alternated. Note that the image data sent via redundant path 334 for either image sensor 310 or image sensor 312 is not the same as the image data sent via redundant path 332. For example, at t0 an image frame captured at image sensor 310 is sent via redundant path 332 while an image frame captured at image sensor 312 is sent via redundant path 334. Then at t1, a different image frame captured at image sensor 310 is sent via redundant path 334 while an image frame captured at image sensor 312 is sent via redundant path 332. By interleaving different image frames at each redundant path, the redundant paths may together transmit a desired resolution or frame rate of image data captured at image data sensors 310 and 312. If one redundant path fails, then data loss is limited to half resolution or frame rate as half of the image frames captured by image sensors 310 and 312 may be transmitted via the remaining path. Data loss may be further minimized by increasing the number of redundant paths (e.g., to 3 so that frame rate or resolution is only reduced by a third).

Although FIG. 3B illustrates equal interleaving, in some embodiments, the data produced by one data producer may be assigned more timeslots than other data producer(s). For example, instead of transmitting an image frame every other timeslot, image sensor 312 may only transmit an image frame every third timeslot along redundant paths 332 and 334. In this way, a redundant path transmission scheme can weight or prioritize data from some data producers for which a higher redundancy or transmission rate is desired.

Figure 4A:
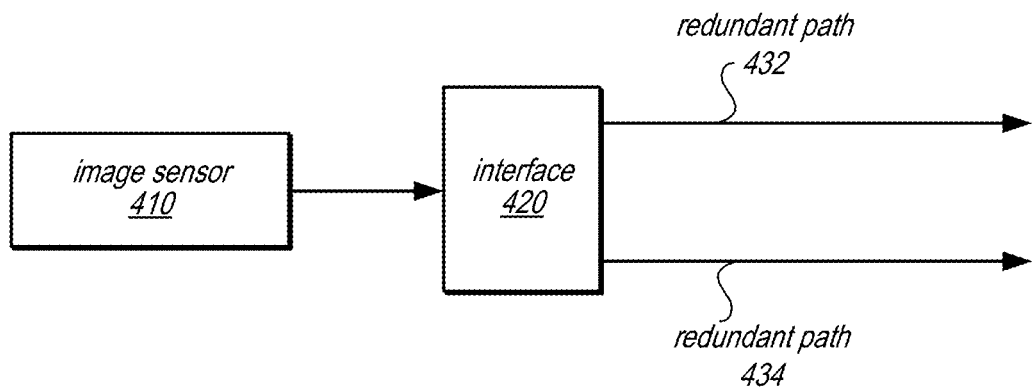
FIG. 4A illustrates a logical block diagram of an example single data producer transmitting data via redundant communication paths, according to some embodiments.

Redundant path communication may also be implemented for a single data producer, in some embodiments. FIG. 4A illustrates a logical block diagram of a single data producer transmitting data via redundant communication paths, according to some embodiments. For example, a single data producer may be a single image sensor, such as image sensor 410. Instead of transmitting entire image frames within a transmission timeslot, the captured image data may be broken down into further components (e.g., base image data and enhancement layers, or rows or groups of rows of pixels). Captured image data may be provided to interface 420 which may divide or assign transmission of the image data to redundant pay 432 or redundant path 434 according to a redundant path transmission scheme.

Figure 4B:
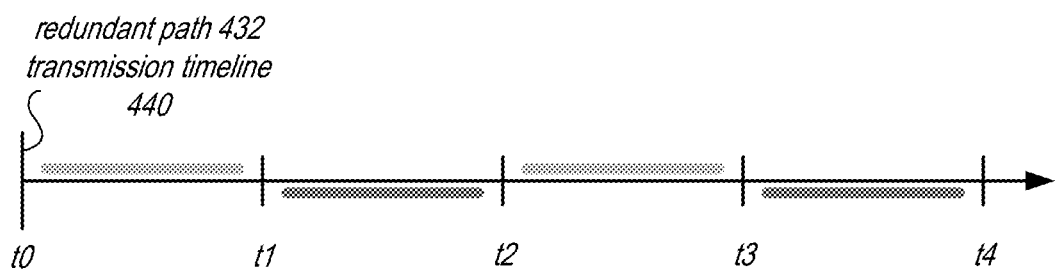
FIG. 4B illustrates an example redundant path transmission scheme for a single data producer, according to some embodiments.
Figure 4B:
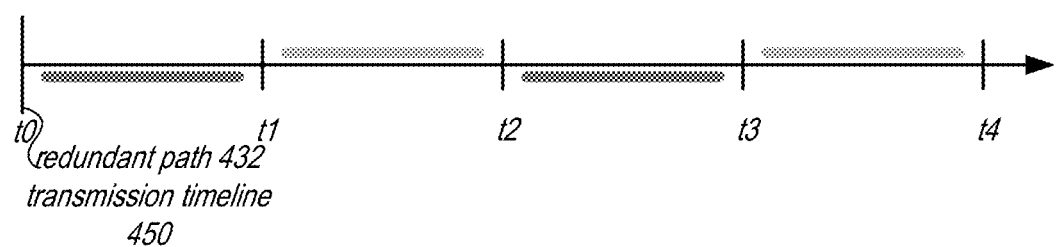

FIG. 4B illustrates a redundant path transmission scheme for a single data producer, according to some embodiments. As noted above, the captured image data maybe broken into parts for transmission according to the redundant path transmission scheme, such as by rows. For example, at t0 an odd row of an image frame captured at image sensor 410 is sent via redundant path 432 while an even row of the image frame (e.g., adjacent to the odd row) captured at image sensor 410 is sent via redundant path 434. Then at t1, a next odd row of the image frame captured at image sensor 410 is sent via redundant path 434 while the next even row of the image frame captured at image sensor 410 is sent via redundant path 432. By interleaving different rows of an image frame at each redundant path, the redundant paths may together transmit a desired resolution or frame rate of image data captured at image data sensor 410. If one redundant path fails, then data loss is limited to half of the row data of image frames captured by image sensor 410 that may be transmitted via the remaining path.

Figure 5A:
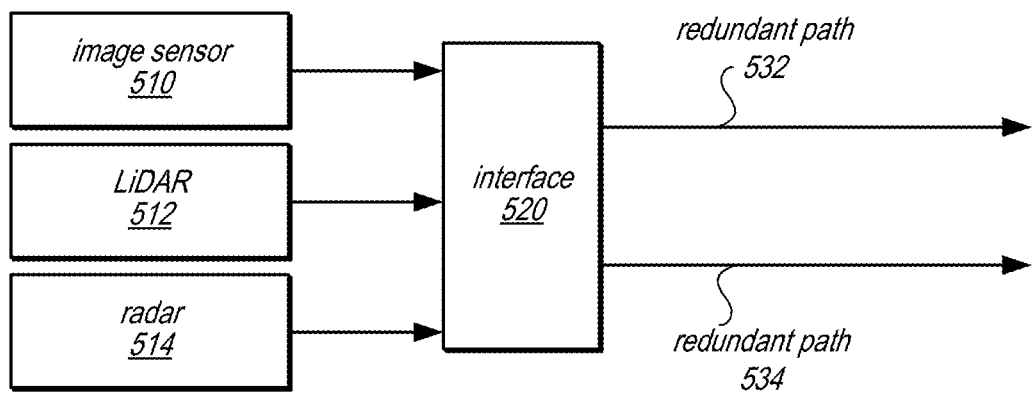
FIG. 5A illustrates a logical block diagram of example heterogeneous data producers transmitting data via redundant communication paths, according to some embodiments.

In addition to single or homogenous data producers, different data producers generating different data can share redundant paths. FIG. 5A illustrates a logical block diagram of heterogeneous data producers transmitting data via redundant communication paths, according to some embodiments. In FIG. 5A, image sensor 510 may provide image data to interface 520 for transmission along redundant path 532 and 534. LiDAR 512 may also determine distance measures which may be transmitted by interface 520 via redundant paths 532 and 534. Radar 514 may also submit distance measures which may be transmitted by interface 520 via redundant paths 532 and 534.

Figure 5B:
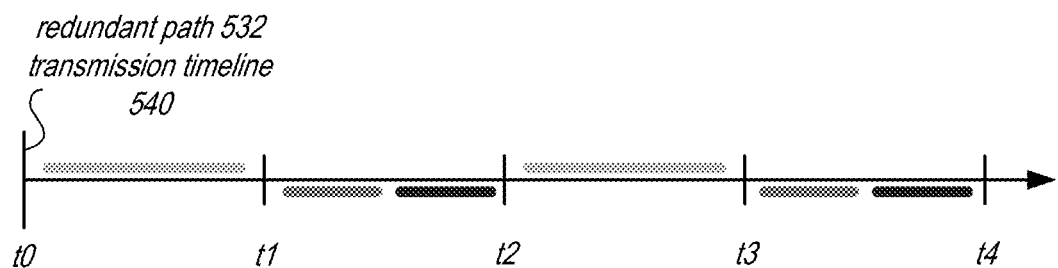
FIG. 5B illustrates an example redundant path transmission scheme for heterogeneous data producers, according to some embodiments.
Figure 5B:
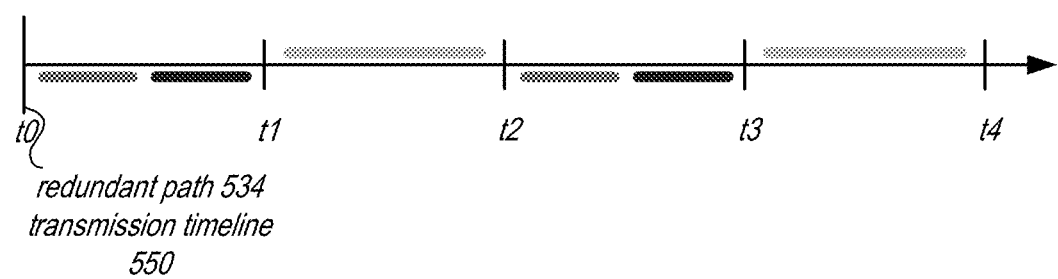

FIG. 5B illustrates a redundant path transmission scheme for heterogeneous data producers, according to some embodiments. As the type of data and/or amount of data transmitted differs between image sensor 510, LiDAR 512 and radar 514, the redundant path transmission scheme may account for these differences. For example, at t0 an image frame captured at image sensor 110 is sent via redundant path 532 while a distance measure captured at LiDAR 512 and a distance measure captured at radar 514 are sent via redundant path 534. Then at t1, a next image frame captured at image sensor 510 is sent via redundant path 534 while the next distance measure captured at LiDAR 512 and the next distance measure captured at radar 514 are sent via redundant path 432. By interleaving types of data at each redundant path, the redundant paths may together transmit different sensor modalities across the same set of redundant paths without having to implement separate redundant paths for each type of data producer. If one redundant path fails, then data loss is not limited to a particular sensor modality, but is instead shared amongst the different sensors providing data (e.g., half of the image frames and half of the distance measures).

Figure 6:
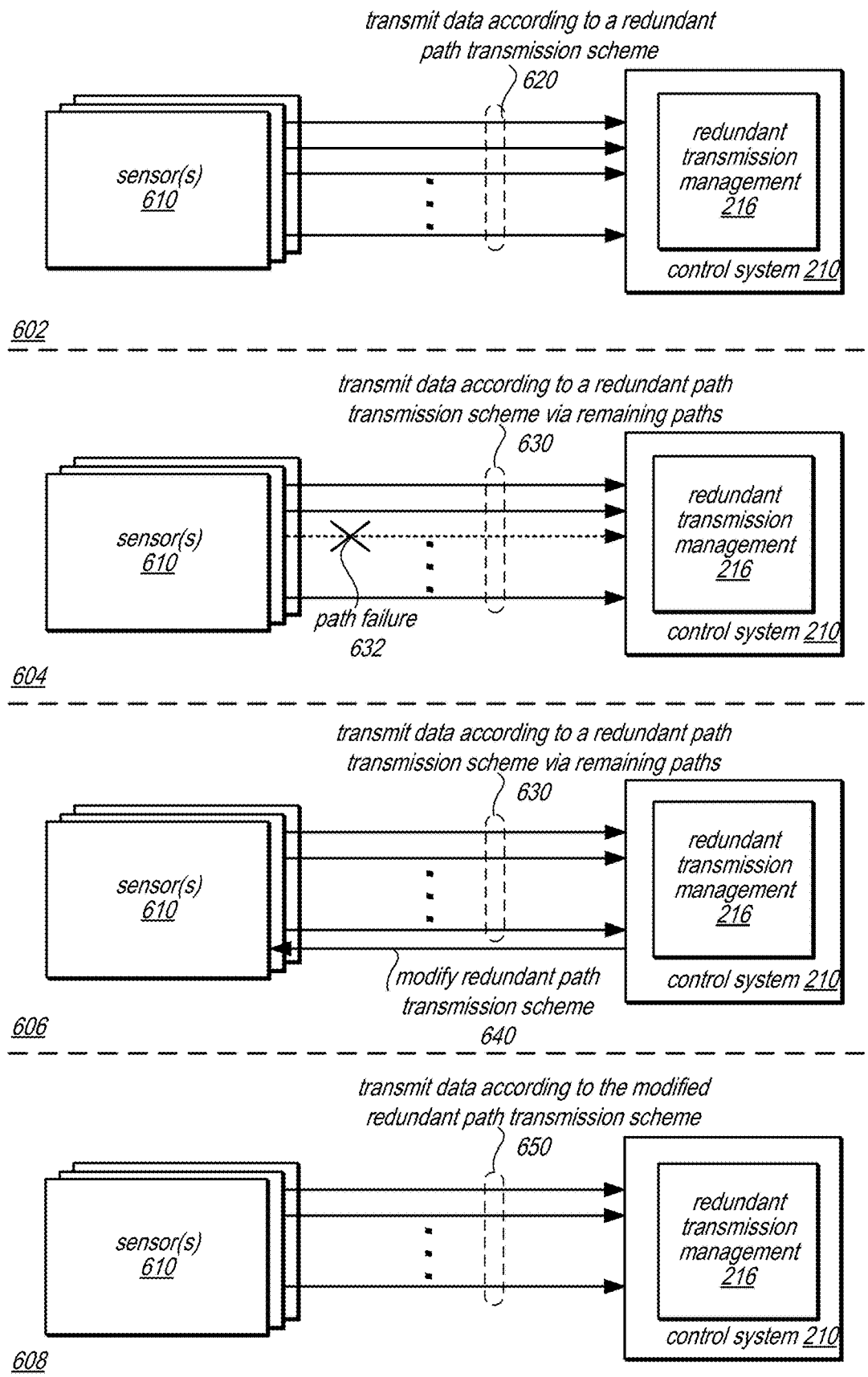
FIG. 6 illustrates a series of example logical illustrations for applying modifications to a redundant path transmission scheme, according to some embodiments.

Circumstances affecting the usefulness or desirability of certain data may change. For instance, in a control system implementing autonomous navigation, sensor data used to direct safety-related operations may be more important to receive at a higher rate than other sensor data. As noted above, the redundant path transmission scheme may be modified to account for changing usefulness or desirability of data. FIG. 6 illustrates a series of logical illustrations for applying modifications to a redundant path transmission scheme, according to some embodiments.

In scene 602, sensor(s) 610 may transmit data to control system 210 according to a redundant path transmission scheme 620 (e.g., according to various redundant path transmission schemes, such as the examples discussed above). Path failure 632 (or multiple path failures) may occur, as illustrated in scene 604. In order to account for the data loss of some sensors, redundant transmission management 216 may determine a modification to the redundant path transmission scheme and send a request to modify the redundant path transmission scheme 640 to sensor(s) 610 (or to an interface implementing the redundant path transmission scheme), as illustrated in scene 606. For example, a modification may be a modification to the type, amount, or frequency of data that is transmitted from a sensor 610, such as changing the encoding of image data or reducing/increasing the number of timeslots allocated to data producer along a remaining path. In some embodiments, the modification may pause or block data generated by one or more data producers (e.g., eliminating one or more sensor modalities) in order to increase capacity for other data producer(s) to transmit data at higher frequency. As illustrated in scene 608, sensor(s) 610 may implement the modification and transmit data according to the modified redundant path transmission scheme 650.

Figure 7:
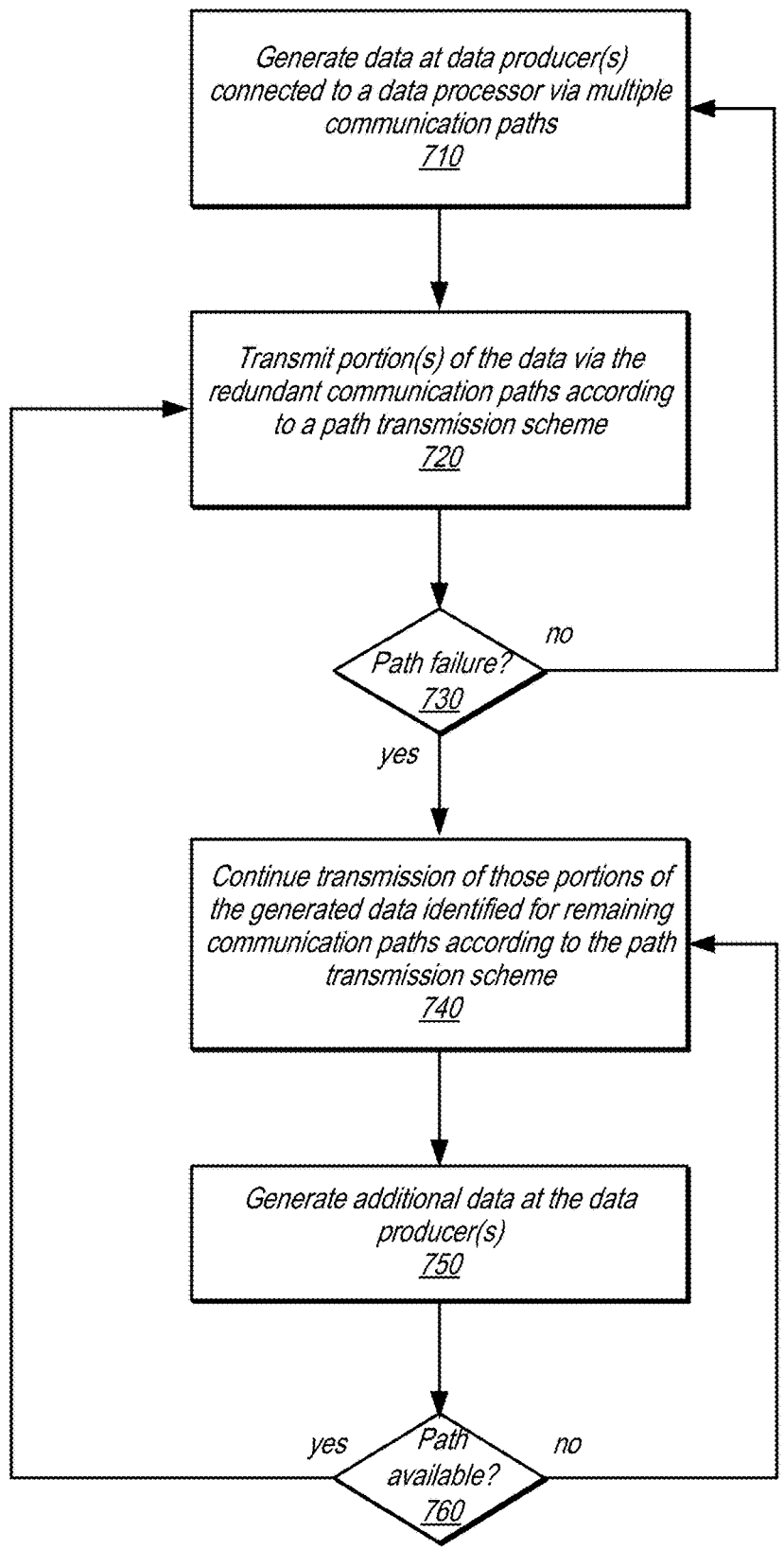
FIG. 7 is a high-level flowchart that illustrates various example methods and techniques to transmit data via redundant communication paths, according to some embodiments.

The control system, data producers, and redundant communication paths and schemes discussed in FIGS. 2 through 6 provide examples of redundant path communication. However, various other types of systems that rely upon a reliable transmission of data from one or multiple data producers to reason over the provided data (e.g., monitoring or tracking systems) may implement redundant path communication according to a redundant path transmissions scheme that divides the data amongst multiple redundant communication paths. FIG. 7 is a high-level flowchart that illustrates various methods and techniques to transmit data via redundant communication paths, according to some embodiments.

As indicated at 710, data producers connected to a data processor via multiple communication paths may generate data. The generated data may include may image data, auditory data, or other sensory/environmental data, range or distance data, location data (e.g., global positioning system (GPS) coordinates), movement data (e.g., gyroscope data), component state or object status information, metrics, statistical calculations or estimates, user input data, or any other data that is generated for consumption by a data processor. The data may be generated at different rates. In at least some embodiments, the generated data may be data that is loss tolerant, which can be interpreted or evaluated in the event that not all generated data is received at the data processor. For example, a stream of image data generated by a data producer (e.g., video data) may be tolerant of missing some individual image frames in the video data without prohibiting processing of the data. Similarly, distance measures, location or motion information may be evaluated as discrete data points without having every other distance measure, location, or motion information that was generated.

The generated data may be provided by the data producers to an interface or other device that prepares and transmits the data via the multiple communication paths. As indicated at 720, portions of the data may be transmitted via the multiple communication paths according to a transmission scheme. For instance, the transmission scheme may define portions of the data as components or sub-portions of data objects generated by the data producers (portions of an image frame or individual measurements from a set of measurements). In some embodiments, the transmission scheme may define the format or encoding of data (e.g., a data compression that is applied to audio data or image data). In addition to defining the portions of the data that are transmitted, the transmission scheme may assign, define, or identify the timing, scheduling, or mapping of portions to particular communication paths. For instance, as discussed above with regard to FIG. 3B, data portions may be assigned to respective time slots according to an interleaved schedule (e.g., every other timeslot on a path, every third timeslot on a path, etc.). In some embodiments, timeslot assignments may be made that group data from multiple data producers together (e.g., by transmitting the data in a single packet or transmission object, or by completing the transmission of the different data from the different data producers within a same timeslot).

Transmission of the portions of data via all of the communication paths may continue while no path failure occurs, as indicated by the negative exit from 730. When a path failure does occur, as indicated by the positive exit from 730, transmission of those portions of data identified for remaining communication paths according to the path transmission scheme may continue automatically. As indicated at 740, transmission may continue for those portions of the generated data identified for remaining communication paths according to the path transmission scheme. For example, if a remaining path indicates that image frames from two different image sensors are interleaved along a communication path, then the alternating image frames that would be identified for that path would still continue to be transmitted. The image frames that would have been transmitted via a failing path may not be transmitted (or may fail to transmit due to the path failure).

Additional portions of data may be generated by the data producers, as indicated at 750, and transmission may continue among the remaining paths, as indicated by the negative exit from 760. If, however, the path failure is repaired or restored, then, as indicated by the positive exit from 760, transmission may continue utilizing all of the communication paths. In this way, failover and restoration of communication paths can be automatically handled by the transmission scheme without manual intervention to ensure that at least some of the generated data is transmitted.

Figure 8:
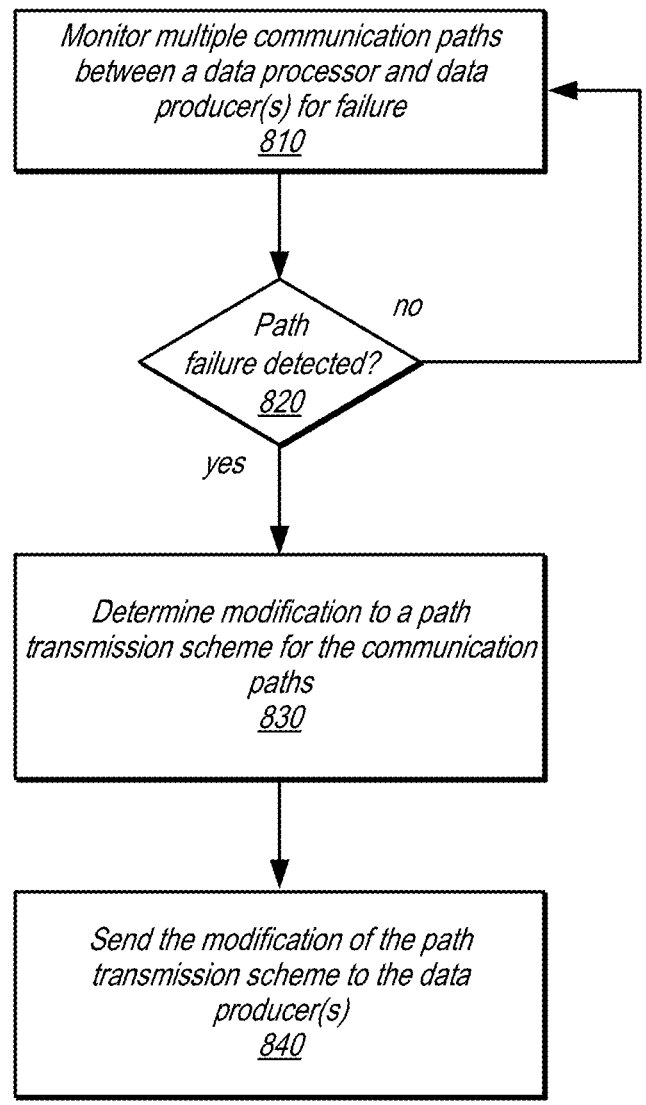
FIG. 8 is a high-level flowchart that illustrates various example methods and techniques to modify a redundant path transmission scheme, according to some embodiments.

Redundant transmission schemes may provide for optimal transmission of data in certain failure scenarios. However, circumstances may change, leaving a current transmission scheme inadequate to meet the data transmission needs of a data processor. For example, while some sensor data at reduced frequency or resolution may be tolerable for short periods of time, if a communication path failure continues, then it may be more beneficial to halt transmission of some sensors and increase the frequency or resolution of others. Therefore, modifying the transmission scheme may allow for path communication to be dynamically adaptable to changing data transmission needs. FIG. 8 is a high-level flowchart that illustrates various methods and techniques to modify a path transmission scheme, according to some embodiments.

As indicated at 810, multiple communication paths between a data processor and data producer(s) may be monitored for failure. For example, a timer may be configured to measure the length of time since a transmission was last received on a communication path. If the timer exceeds a certain threshold, then it may be determined that a failure has occurred on the communication path corresponding to the timer.

If a path failure is detected, as indicated by the positive exit from 820, then a modification to a path transmission scheme for the communication paths may be determined, as indicated at 830. For example, current data needs or priorities may be identified (e.g., by evaluating a current state or mode of operation of a control system). If, for instance, an autonomous navigation system is operating in autonomous driving mode, then data that is particular to making navigation decisions may be prioritized (e.g., image data for detecting physical objects in a route). Other data, such as location information, may be reduced to a lower frequency (e.g., as the exact location may not be as important for performing certain navigation operations). Therefore, a modification that increases the frequency at which image data is transmitted via remaining communication paths may be determined for the transmission scheme. In some embodiments, modifications may change or modify the content of the data that is sent. For example, some data may include multiple layers or features, not all of which need be transmitted or evaluated. For such data, some of the generated layers or features may be excluded from transmission in order to free capacity for increasing the frequency at which the data is sent (or at which other data is sent). As noted earlier, in some instances, a modification may be determined that data generated by one or more data producers should be discarded instead of being transmitted.

Once determined, the modification to the path transmission scheme may be sent to the data producer(s) or other components that implement the path transmission scheme (e.g., an interface component), as indicated at 840. An acknowledgement or denial of the request may be received in response, in some embodiments.

In some embodiments, modifications to transmission schemes may be performed without detecting a path failure. For instance, a control system that monitors operational activities that are reduced or halted according to a schedule (e.g., day shift or night shift) may result in a change in a redundancy transmission scheme to prioritize the transmission of different data that is not affected by the change in activities. Similarly, in another example, changing from an autonomous navigation mode to a manual navigation mode may instigate changes to the sensor data provided so that information such as location information for navigation display in a vehicle may be prioritized over image data for performing object recognition. Thus, some modifications to transmission schemes may be changed in response to detecting different events or scenarios.

Figure 9:
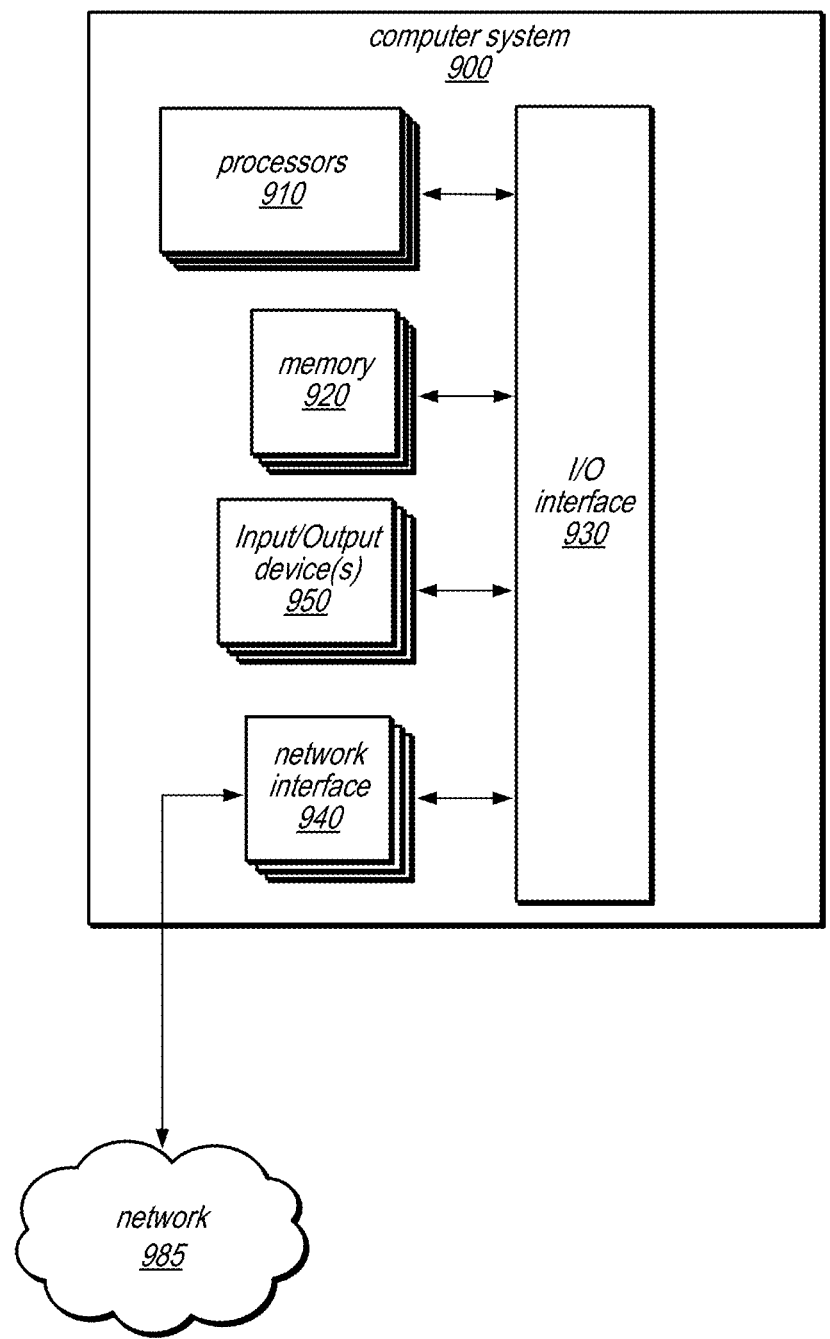
FIG. 9 is an example computer system, according to some embodiments.

FIG. 9 illustrates an example computer system 900 that may be configured to include or execute any or all of the embodiments described above. In different embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a control system or data producers may be executed in one or more computer systems 900, which may interact with various other devices. Note that any component, action, or functionality described above with respect to FIGS. 1 through 8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices, which can include one or more user interface (also referred to as "input interface") devices. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions, data, etc. accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 920 may be configured to implement some or all of an automated image capture system, incorporating any of the functionality described above. Additionally, existing control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
one or more sensors that generate respective data, wherein the sensors are connected to an interface;
a plurality of redundant communication paths from the interface to a control system interface; and
the control system, configured to:
receive portions of the respective data via different ones of the plurality of redundant communication paths to the control system according to a redundant path transmission scheme, wherein the redundant path transmission scheme divides transmission of the portions of the respective data generated by the one or more sensors among more than one of the redundant communication paths;
detect an event to modify the redundant path transmission scheme;
determine a modification to the redundant path transmission scheme; and
send the modification to the redundant path transmission scheme to the one or more sensors to implement the modification to the redundant path transmission scheme, wherein additional portions of the respective data are subsequently received at the control system according to the modified redundant path transmission scheme.

2. The apparatus of claim 1, wherein to detect the event to modify the redundant path transmission scheme, the control system is configured to monitor operational activities of the control system to detect a change in the operational activities as the event to modify the redundant path transmission scheme.

3. The apparatus of claim 1, wherein to detect the event to modify the redundant path transmission scheme, the control system is configured to detect a failure of at least one of the redundant communication paths as the event to modify the redundant path transmission scheme.

4. The apparatus of claim 1, wherein to determine the modification to the redundant path transmission scheme, the control system is configured to evaluate a current state of the control system to identify data priorities for the control system.

5. The apparatus of claim 1, wherein the modification to the redundant path transmission scheme directs a change in encoding of those transmitted portions of the respective data generated by at least one of the one or more sensors.

6. The apparatus of claim 1, wherein the modification to the redundant path transmission scheme halts transmission of portions of the respective data generated by at least one of the one or more sensors.

7. The apparatus of claim 1, wherein the one or more sensors comprise at least one of an image sensor, a radio detection and ranging (radar) sensor, or a light detection and ranging (LiDAR) sensor, and wherein the control system comprises an autonomous navigation system for a vehicle.

8. A method, comprising:
receiving, at a control system, portions of respective data generated at one or more data producers connected to the control system via a plurality of redundant communication paths to the control system according to a redundant path transmission scheme, wherein the redundant path transmission scheme divides transmission of the portions of the respective data generated by the data producers among more than one of the redundant communication paths;
detecting an event to modify the redundant path transmission scheme;
determining a modification to the redundant path transmission scheme; and
sending the modification to the redundant path transmission scheme to the one or more data producers to implement the modification to the redundant path transmission scheme, wherein additional portions of the respective data are subsequently received at the control system according to the modified redundant path transmission scheme.

9. The method of claim 8, wherein detecting the event to modify the redundant path transmission scheme comprises monitoring operational activities of the control system to detect a change in the operational activities as the event to modify the redundant path transmission scheme.

10. The method of claim 8, wherein detecting the event to modify the redundant path transmission scheme comprises detecting a failure of at least one of the redundant communication paths as the event to modify the redundant path transmission scheme.

11. The method of claim 8, wherein determining the modification to the redundant path transmission scheme comprises evaluating a current state of the control system to identify data priorities for the control system.

12. The method of claim 8, wherein the modification to the redundant path transmission scheme directs a change in encoding of those transmitted portions of the respective data generated by at least one of the one or more data producers.

13. The method of claim 8, wherein the modification to the redundant path transmission scheme halts transmission of portions of the respective data generated by at least one of the one or more data producers.

14. The method of claim 8, wherein the modification to the redundant path transmission scheme increases a frequency of transmission of portions of the respective data generated by at least one of the one or more data producers.

15. A control system, comprising:
at least one processor;
a memory storing program instructions that when executed by the at least one processor cause the control system to:
receive portions of respective data generated at one or more data producers connected to the control system via a plurality of redundant communication paths to the control system according to a redundant path transmission scheme, wherein the redundant path transmission scheme divides transmission of the portions of the respective data generated by the data producers among more than one of the redundant communication paths;
detect an event to modify the redundant path transmission scheme;
determine a modification to the redundant path transmission scheme; and
send the modification to the redundant path transmission scheme to the one or more data producers to implement the modification to the redundant path transmission scheme, wherein additional portions of the respective data are subsequently received at the control system according to the modified redundant path transmission scheme.

16. The control system of claim 15, wherein to detect the event to modify the redundant path transmission scheme, the program instructions cause the control system to monitor operational activities of the control system to detect a change in the operational activities as the event to modify the redundant path transmission scheme.

17. The control system of claim 15, wherein to detect the event to modify the redundant path transmission scheme, the program instructions cause the control system to detect a failure of at least one of the redundant communication paths as the event to modify the redundant path transmission scheme.

18. The control system of claim 15, wherein to determine the modification to the redundant path transmission scheme, the program instructions cause the control system to evaluate a current state of the control system to identify data priorities for the control system.

19. The control system of claim 15, wherein the modification to the redundant path transmission scheme directs a change in encoding of those transmitted portions of the respective data generated by at least one of the one or more data producers.

20. The control system of claim 15, wherein the modification to the redundant path transmission scheme increases a frequency of transmission of portions of the respective data generated by at least one of the one or more data producers.

* * * * *